June 21, 1960  E. V. BERSINGER  2,941,399
AIRCRAFT INSTRUMENTS
Filed March 18, 1957  5 Sheets-Sheet 1

INVENTOR.
EVERITT V. BERSINGER
BY Roger W. Jensen
ATTORNEY

June 21, 1960     E. V. BERSINGER     2,941,399
AIRCRAFT INSTRUMENTS
Filed March 18, 1957     5 Sheets-Sheet 2

FIG. 2

INVENTOR.
EVERITT V. BERSINGER
BY Roger W. Jensen
ATTORNEY

June 21, 1960     E. V. BERSINGER     2,941,399
AIRCRAFT INSTRUMENTS

Filed March 18, 1957     5 Sheets-Sheet 4

INVENTOR.
EVERITT V. BERSINGER

BY Roger W. Jensen

ATTORNEY

United States Patent Office 2,941,399
Patented June 21, 1960

2,941,399
AIRCRAFT INSTRUMENTS

Everitt V. Bersinger, St. Paul, Minn., assignor to Minneapolis-Honeywell Regulator Company, Minneapolis, Minn., a corporation of Delaware Filed Mar. 18, 1957, Ser. No. 646,794

7 Claims. (Cl. 73—116)

This invention relates to the field of aviation instruments and more particularly to a jet engine thrust indicator.

Due to the recent advancement of turbojet engines, a need for indicating available thrust from these engines is required other than a method relying on tailpipe temperature and engine rotor rotational speed. Many of the new turbojet engines produce, in the normal operating range, a thrust which is almost independent of engine rotor speed. Due to the engine speed-thrust characteristics of these engines it is more advantageous to measure the thrust from parameters such as engine inlet temperature, exhaust nozzle area, total pressure to the compressor, and tailpipe total pressure. Momentum equations for thrust of a turbojet engine are generally given as:

$$Fg = \frac{GaV_8}{g} + A_8(P_8 - P_o) \qquad (1)$$

$$Fn = \frac{Ga}{g}(V_8 - V_o) + A_8(P_8 - P_o) \qquad (2)$$

where:

$Fn$ = Net thrust, lbs.
$Fg$ = Gross thrust or exit momentum, lbs.
$Ga$ = Weight rate flow of air, lbs./sec.
$V_8$ = Velocity at nozzle axis, ft./sec.
$g$ = Acceleration of gravity, ft./sec.$^2$
$A_8$ = Flow area at nozzle exit, in.$^2$
$P_8$ = Static pressure at nozzle, exit, lbs./in.$^2$
$P_o$ = Static pressure at engine inlet, lbs./in.$^2$ These two equations are the accepted definition of thrust and may be written in terms of a total and static pressure at the inlet and exit stations of the turbojet engine as follows:

$$Fg = A_8 \left\{ P_{t8} \left[ \frac{k_8+1}{\left(\frac{k_8+1}{2}\right)^{\frac{k_8}{k_8+1}}} \right] - P_o \right\} \qquad (3)$$

$$Fn = A_8 \left\{ P_{t8} \left[ \frac{k_8+1}{\left(\frac{k_8+1}{2}\right)^{\frac{k_8}{k_8-1}}} \right] - P_o \right\}$$

$$- \frac{2k_o}{k_o-1} P_o A_o \left[ \left(\frac{P_{to}}{P_o}\right)^{\frac{k_o-1}{k_o}} - 1 \right] \qquad (4)$$

The above equations are valid when the exhaust nozzle is choked, however, in modern high compression engines this condition is met under all but the lowest power settings.

Equation 3 shows that the gross thrust is a direct function of the pressure difference between tailpipe total pressure and ambient static pressure. The apparent simplicity of this expression has probably led the majority of persons investigating the problem toward thrust measurement using a pressure differential. However, the use of a pressure differential method has disadvantages in that: (1) sensitivity of the pressure differential device drops off at high altitudes, (2) the ambient static pressure is difficult to measure accurately, (3) total pressure at the tailpipe nozzle and the ratio of specific heats are functions of the amount of heat added in the afterburner, (4) the use of this method requires more variables to compute the values of thrust than does a system involving pressure ratio.

Since it is impractical to measure the force exerted by an engine upon an airframe directly, this force, if it is to be known, must be computed from consideration of the momentum change of the fluid flowing through the engine. Thus, the thrust to be measured may be defined by:

$$Fn = Fg - \frac{WaV_o}{g} \qquad (5)$$

where:

$Fn$ = Net thrust, lbs.

$Fg$ = Gross thrust or exit momentum, lbs.

$\frac{WaV_o}{g}$ = Ram drag or inlet momentum, lbs.

My invention relates to the use of suitable engine parameters to measure the ratio of the net thrust being developed to a maximum net thrust which could be developed by the engine under existing conditions. This quantity which is measured is defined as percent of available thrust. A relationship has been found between the ratio of compressor inlet total pressure and turbine discharge total pressure, hereinafter called engine pressure ratio, and compressor inlet total temperature such that a simple computer may be used to compute percent of available thrust.

The present invention combines several components in such a manner as to allow the aircraft pilot to readily ascertain what percent of that thrust available under the existing flight conditions is being developed by the aircraft power plant. Specifically, one area of novelty in the present invention comprises multiplying compressor inlet total temperature, engine pressure ratio, and tailpipe area to produce a signal representative of available turbojet engine net thrust.

It is a general object of the present invention to provide an improvement in aircraft instruments, particularly in the field of turbojet engine thrust indicators.

Still another object of the present invention is to provide, in a percent of net thrust indicator, a direct indication of maximum available thrust.

A further object of the present invention is to provide an instrument which will indicate turbojet engine available thrust without the use of the engine parameter of rotor speed.

A further object of this invention is to provide an instrument which is driven by a computer that inherently compensates for ambient temperature.

Another object of this invention is to eliminate the use of charts when used in conjunction with a pressure ratio indicator to indicate the amount of thrust produced by a turbojet engine.

These and other features of the invention will be understood more clearly and fully from a following detailed description and accompanying drawings in which.

Figure 9:
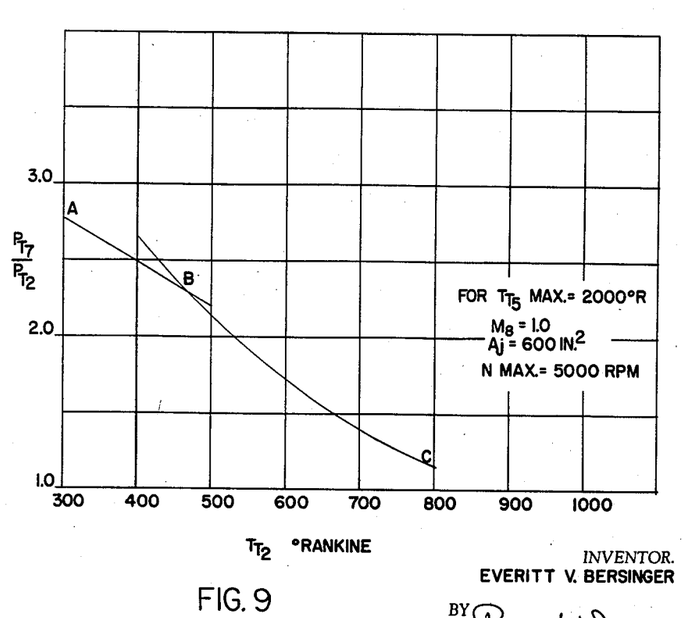
Figure 9 refers to a curve representative of 100% available thrust with a maximum turbine temperature of 2000 degrees Rankine and a maximum speed of 5000 revolutions per minute and defines the pressure ratio, $P_{t7}/P_{t2}$, corresponding to 100% of available thrust as a function of the compressor inlet total temperature, $T_{t2}$, only.

It has been found that for certain turbojet engines there is a straight line relationship between corrected net thrust and engine pressure ratio $P_{t7}/P_{t2}$, where the pressure ratio corresponding to rated conditions may be defined by a function of inlet total temperature only as shown in Figure 9. This relationship can best be shown by an example using typical engine performance curves, however, it is more convenient to consider corrected net thrust rather than net thrust $Fn/P_{t2}$ in finding the relationship just mentioned for a typical turbojet engine. The corrected net thrust is given by:

$$\frac{Fn}{P_{t2}} = \frac{Fg}{P_{t2}} - \frac{WaV_o}{P_{t2}g} \quad (6)$$

Where:

$Fn$=Net thrust, lbs.
$Fg$=Gross thrust or exit momentum, lbs.
$Wa$=Weight rate of air flow, lbs./sec.
$V_o$=Aircraft velocity, ft./sec.
$g$=Acceleration of gravity, ft./sec.$^2$
$P_{t2}$=Compressor inlet total pressure, lbs./in.$^2$
$P_{t7}$=Turbine outlet total pressure, lbs./in.$^2$
$T_{t2}$=Compressor inlet total temperature, degrees Rankine
$T_{t5}$=Turbine inlet total temperature, degrees Rankine
$T_o$=Ambient static temperature, degrees Rankine
$P_o$=Ambient static pressure, lbs./in.$^2$
$n$=Engine rotational speed r.p.m.
$(gR)$=Gas constant in mass units, $$\frac{ft.^2 \text{ degrees}}{sec.^2}$$

$L$=Linear dimension of the engine, ft.
$M_o$=Aircraft Mach number, dimensionless.
$A_j$=Tailpipe cross-sectional area, in.$^2$ It may be shown by using the Buckingham $\pi$ theorem that gross thrust $Fg$, is a function of $n$, $P_{t2}$, $P_{t7}$, $T_{t2}$, $L$ and $(gR)$. When all of the constant terms such as $L$, $gR$, and dimensional conversion factors, etc. are grouped, the results obtained are as follows:

$$\pi 1 = P_{t7}/P_{t2} \quad (7)$$

$$\pi 2 = n/\sqrt{T_{t2}} \quad (8)$$

$$\pi 3 = Fg/P_{t2} \quad (9)$$

But $$\pi 3 = \Phi(\pi_2, \pi_1) \quad (10)$$

Where:

$\Phi$ means "some function of"

In other words $Fg/P_{t2}$ is "some function of" $\pi_2$, $\pi_1$, therefore $$Fg/P_{t2} = \Phi_1(n/\sqrt{T_{t2}}, P_{t7}/P_{t2}) \quad (11)$$

In solving for the $WaV_0/P_{t2}g$ term it is found that $$V_o = 49.1 M_o \sqrt{T_o} \quad (12)$$

and $$\frac{WaV_o}{P_{t2}g} = \frac{49.1 M_o \sqrt{T_o}}{32.2 \sqrt{T_{t2}}} \times \frac{Wa\sqrt{T_{t2}}}{P_{t2}}$$

$$= 1.525 M_o \sqrt{\frac{T_o}{T_{t2}}} \times \frac{Wa\sqrt{T_{t2}}}{P_{t2}} \quad (13)$$

but since the inlet air flow is adiabatic $$\frac{T_o}{T_{t2}} = \frac{1}{1+0.2M^2} \quad (14)$$

So $$\frac{WaV_o}{P_{t2}g} = \frac{Wa\sqrt{T_{t2}}}{P_{t2}} \frac{1.525 M}{\sqrt{1+0.2M^2}} \quad (15)$$

Using the Buckingham $\pi$ theorem to solve for the $Wa\sqrt{T_{t2}}/P_{t2}$ term yields $$\pi_4 = \pi_1 = P_{t7}/P_{t2} \quad (16)$$

$$\pi_5 = \pi_2 = n/\sqrt{T_{t2}} \quad (17)$$

$$\pi_6 = \frac{Wa\sqrt{T_{t2}}}{P_{t2}} \quad (18)$$

and $$\pi_6 = \Phi(\pi_1, \pi_2) \quad (19)$$

So $$\frac{Wa\sqrt{T_{t2}}}{P_{t2}} = \Phi_2(n/\sqrt{T_{t2}}, P_{t7}/P_{t2}) \quad (20)$$

Therefore in solving for corrected net thrust, it has been shown that $$\frac{Fn}{P_{t2}} = \frac{Fg}{P_{t2}} - \frac{Wa\sqrt{T_{t2}}}{P_{t2}} \frac{1.525 M_o}{\sqrt{1+0.2M_o^2}} \quad (21)$$

where $Fn/P_{t2}$ is "some function of" $P_{t7}/P_{t2}$ and $n/\sqrt{T_{t2}}$.

Figure 5:
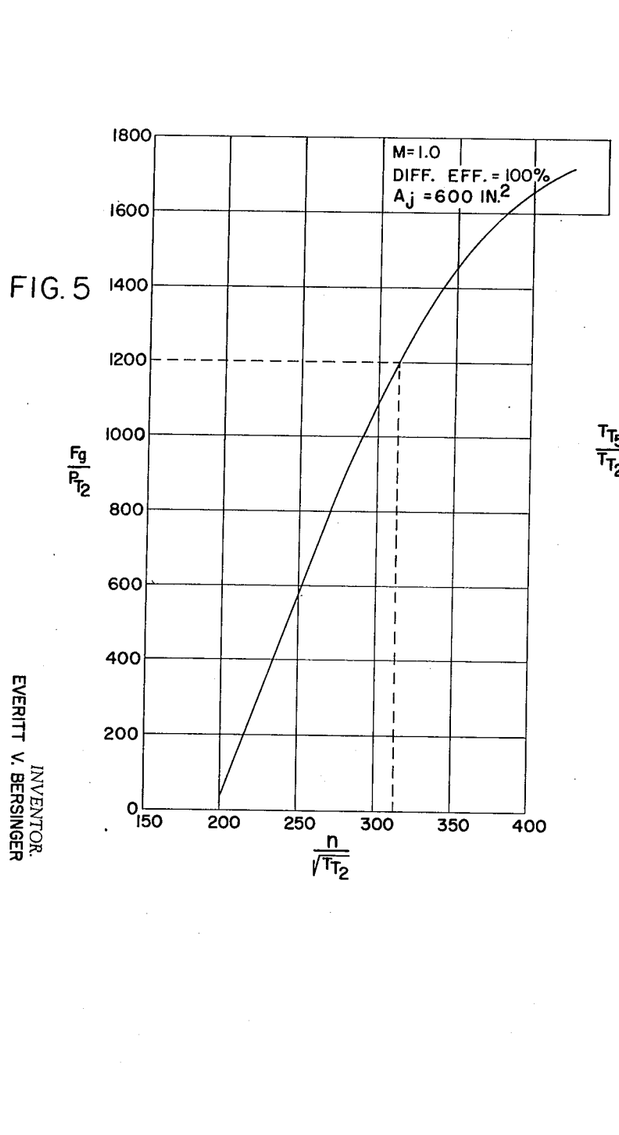

Making use of Equation 21 and Figures 3, 4, 5, and 7 which show respectively $Wa\sqrt{T_{t2}}/P_{t2}$, $P_{t7}/P_{t2}$, $Fg/P_{t2}$ as functions of $n/\sqrt{T_{t2}}$ and $Fn$ as a function of $P_{t7}/P_{t2}$ an example will be used to show how $Fn/P_{t2}$ is found. Assuming a value of Mach number to be 1.00 and a fixed tailpipe cross-sectional area of 600 square inches, a value of $Fn/P_{t2}$ equal to 848 will be found in the following manner:

(1) Figure 5 reveals that a value of 315 for $n/\sqrt{T_{t2}}$ yields a value of 1200 for $Fg/P_{t2}$.

Figure 3:
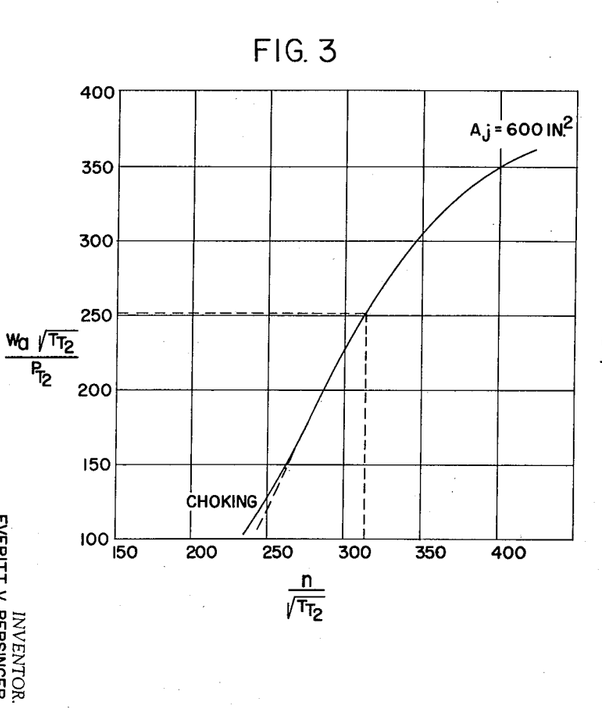
Figures 3, 4, 5, 6, and 7, refer to typical engine performance curves which are shown in the British Normalizing System.

(2) Figure 3 reveals that for the same value (315) of $n/\sqrt{T_{t2}}$, a value of 253 may be found for $Wa\sqrt{T_{t2}}/P_{t2}$.

(3) For a value of $M=1$, the expression $$1.525M/\sqrt{1+0.2M^2}$$

equal 1.392 and when multiplied by 253 gives a value of 352.

Figure 4:
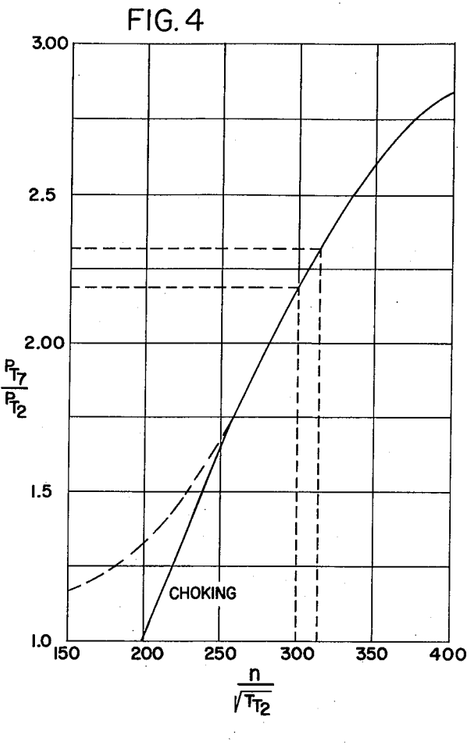

(4) $Fn/P_{t2} = 1200 - 352 = 848$ which corresponds to the value of $n/\sqrt{T_{t2}}$ equal to 315, but since $Fn/P_{t2}$ is given as a function of $P_{t7}/P_{t2}$, the simple approach is to refer to Figure 4 for the corresponding value of $P_{t7}/P_{t2}$ for a value of $n/\sqrt{T_{t2}}$ equal to 315.

(5) A value of $n/\sqrt{T_{t2}}$ equal to 315 gives a value of 2.33 for $P_{t7}/P_{t2}$.

Figure 7:
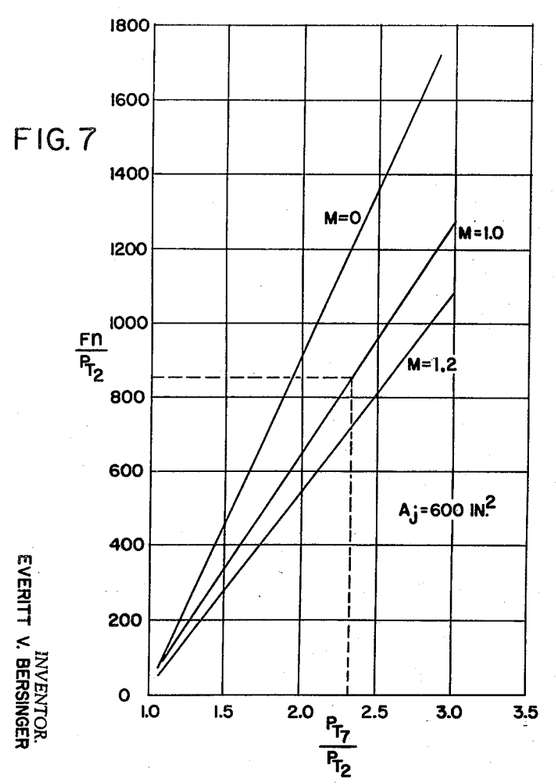

(6) Using the value of 2.33 for $P_{t7}/P_{t2}$ in Figure 7, it can be found that the corresponding value of $Fn/P_{t2}$ is 848.

By plotting a series of points from the engine performance data it will become evident that there is a straight line relationship between corrected net thrust $Fn/P_{t2}$ and engine pressure ratio $P_{t7}/P_{t2}$.

Figure 6:
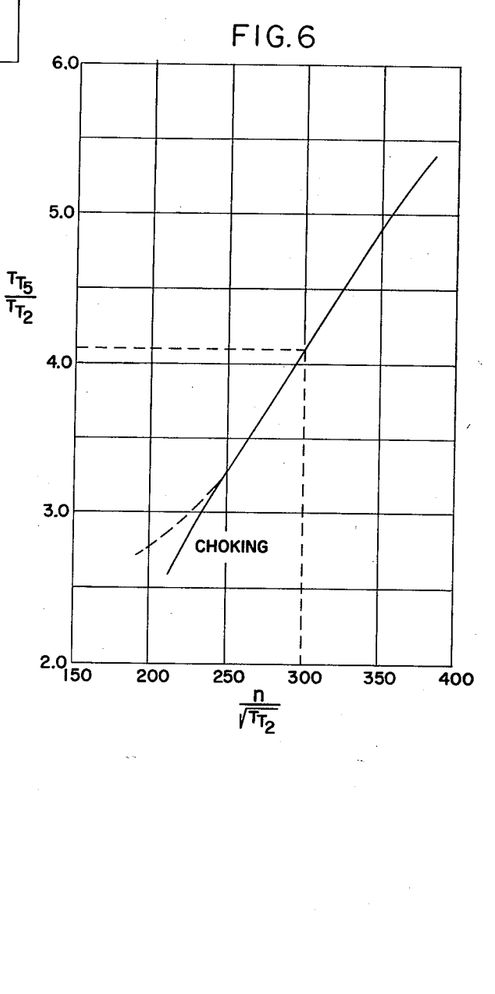
Figure 8:
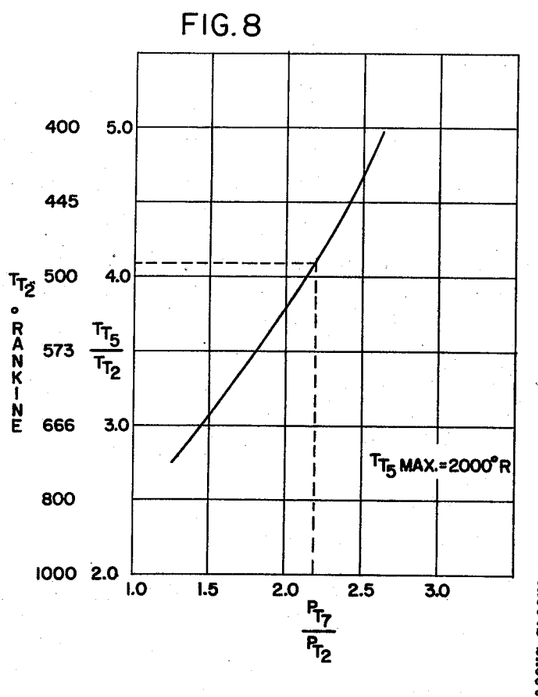
Figure 8 refers to a typical engine performance curve where a maximum allowable turbine total temperature, $T_{t5}$ has been selected as 2000 degrees Rankine.

Making use of the engine performance curves shown in Figures 4 and 6, it will now be shown that $T_{t5}/T_{t2}$ may be found as a function of $P_{t7}/P_{t2}$ and thereby eliminate the corrected engine speed term $n/\sqrt{T_{t2}}$. In other words, engine rotational speed may be eliminated as an independent variable. If a new curve is plotted such as Figure 8, the relationship between $P_{t7}/P_{t2}$ and $T_{t5}/T_{t2}$ may be found. The curve shown in Figure 8 is found by plotting successive values of $P_{t7}/P_{t2}$ and $T_{t5}/T_{t2}$ for corresponding values of $n/\sqrt{T_{t2}}$ such as shown for the value of 300.

Generally a turbojet engine is rated in terms of a maximum rotor speed and a maximum turbine inlet temperature so that on a very cold day the engine may reach the maximum rotor speed before the temperature limit is reached and on a very hot day the engine may reach the limiting temperature first. For illustrative purposes it will be assumed that the maximum turbine inlet total temperature $T_{t5}$ is 2000° Rankine and the maximum engine rotor speed is 5000 r.p.m. By assigning the value of 2000° R. to $T_{t5}$, Figure 8 may be made to show a relationship between $P_{t7}/P_{t2}$ and $T_{t2}$ for the maximum conditions of turbine inlet total temperature.

The compressor inlet total temperature $T_{t2}$ is a function of Mach number and ambient static temperature $T_0$, but since $T_{t2}$ is involved, it will be measured rather than ambient static temperature $T_0$. $T_{t2}$ will provide more accuracy since it may be measured more accurately than $T_0$, however, the ambient total temperature will be identical to compressor inlet total temperature since the inlet airflow is adiabatic.

The engine is assumed to have a diffuser having 100 percent recovery below $M=1$ and above $M=1$ it is assumed the diffuser will have a theoretical recovery where the air entering passes through one oblique and one normal shock wave. This means that during normal operation the ram pressure ratio will be such as to cause the engine to operate with a choked nozzle.

Figure 9 has been drawn from the relationship between $P_{t7}/P_{t2}$ and $T_{t2}$ where $T_{t5}$ and $n$ are at maximum values of 2000° R. and 5000 r.p.m. respectively. Thus, Figure 9 defines the limiting value of $P_{t7}/P_{t2}$ for a given inlet total temperature $T_{t2}$ such that a turbojet engine operating at any point on the curve would be developing 100 percent of the thrust available from the engine, but if the pressure ratio is less than the value required, the percent of available net thrust will be less than 100%. It will be remembered that the turbojet engine is generally rated in terms of a maximum rotor speed and a maximum turbine inlet temperature and from Figure 9 the curve from A to B is limited by the engine rotor speed and from B to C on the curve by inlet temperature.

Due to the straight line relationship shown in Figure 7, the limiting values of $P_{t7}/P_{t2}$, which are defined at any 100 percent thrust point shown on the curve of Figure 9, may be plotted on Figure 7 to give corrected net thrust $Fn/P_{t2}$ as a straight line passing through the zero net thrust point at a pressure ratio of unity and through the pressure ratio point corresponding to the 100 percent available thrust point, when the temperature $T_{t2}$ also intersects this point. From the information just disclosed, it is evident that a measure of the available net thrust of a turbojet engine may be computed by multiplying signals representative of inlet temperature and engine pressure ratio where the turbojet engine has a fixed tailpipe cross-sectional area. However, if a variable cross-sectional area signal is combined with the two previously mentioned signals the computer is adapted for use in the after burning stage of operation. Thus a simple relationship of $$\%Fn = A_i(T_{t2})\frac{P_{t7}}{P_{t2}} \qquad (22)$$

exists which can easily be constructed into a computer which will now be described.

Figure 1:
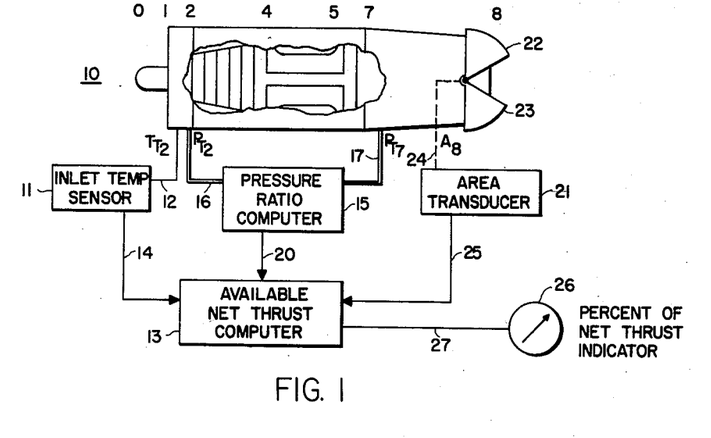
Figure 1 is a block diagram showing a turbojet engine connected to the various components which are required to provide percent of available net thrust.

Figure 1 discloses a jet engine 10 having a series of stations to aid in its description designated as station 0, 1, 2, 4, 5, 7, and 8. Station 0 is located in the free stream air, station 1 is located at the inlet of the diffuser, station 2 is located at the compressor inlet, station 4 is located at the burner inlet, station 5 is located at the turbine inlet, station 7 is located at the turbine exit and station 8 is located at the nozzle of the turbojet engine tailpipe. Compressor inlet total temperature $T_{t2}$ is sensed by a temperature sensor 11 through a suitable connecting means 12 where a signal representative of $T_{t2}$ is sent to an available net thrust computer 13 through a suitable connecting means 14. A pressure ratio signal is sensed by a pressure ratio computer 15 which has inputs of $P_{t2}$ through a suitable connecting means 16 and $P_{t7}$ through a connecting means 17. Available net thrust computer 13 receives the pressure ratio signal from pressure ratio computer 15 through a suitable connecting means 20. An area transducer 21 is adjusted due to a change of the tail pipe nozzle area at station 8 by a pair of movable nozzle doors 22 and 23. As nozzle doors 22 and 23 are moved, area transducer 21 is actuated through a suitable connecting means 24. Area transducer 21 provides a signal to available net thrust computer 13 which is representative of the tailpipe cross-sectional area through a suitable connecting means 25. Available net thrust computer 13 computes the amount of thrust as a percentage of the amount available and a signal representative of this value is sent to a percent of net thrust indicator 26 through a suitable connecting means 27. Pressure ratio computer 15 may be of the type disclosed in a co-pending application of Robert J. Kutzler, Serial No. 432,249, filed May 25, 1954 and assigned to the Minneapolis-Honeywell Regulator Company.

Figure 2:
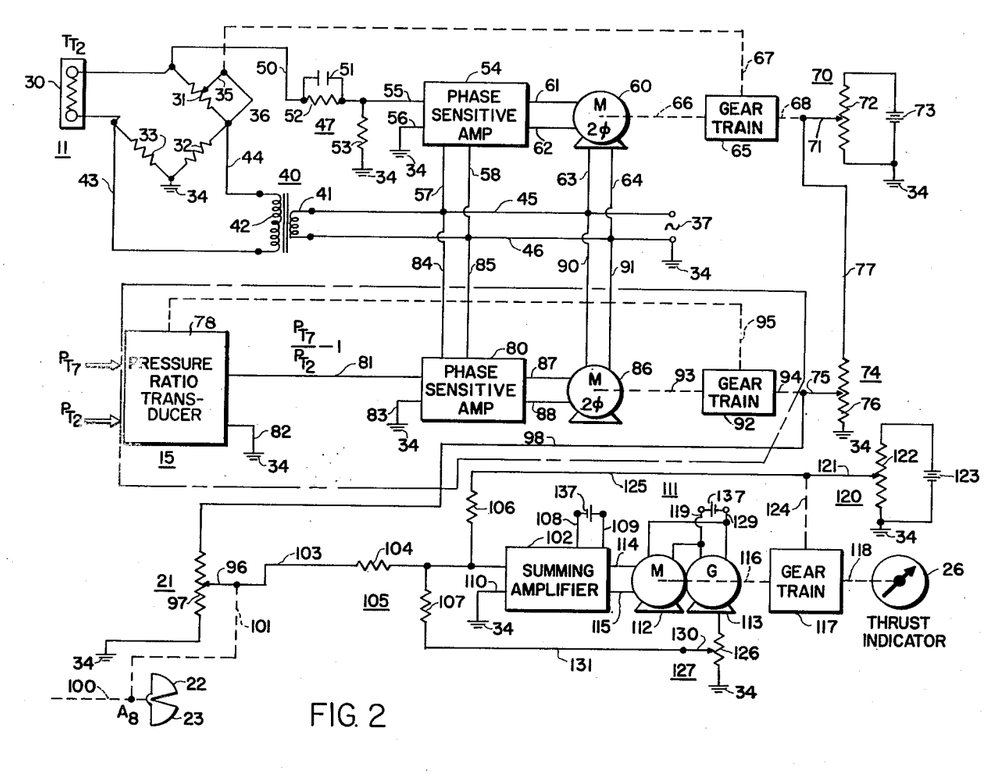
Figure 2 is a schematic diagram showing the components of the apparatus and how they are interconnected.

Figure 2 shows inlet temperature sensor 11, comprising a bridge network made up of four resistors 30, 31, 32, and 33. Resistor 30 is a temperature sensitive resistor in the form of a probe and has one end connected to resistor 33. The other ends of resistors 31 and 33 are connected to opposite ends of resistor 32. At a point where resistors 33 and 32 are joined, the circuit is connected to ground 34. Resistor 31 is of the variable type and has a movable contact arm 35 which is electrically connected to the junction point of resistors 31 and 32 by a connecting lead 36. An alternating voltage source 37 energizes a primary winding 41 of a transformer 40 through a pair of common leads 45 and 46. Common lead 46 is connected to ground 34. Transformer 40 has a secondary winding 42 which supplies voltage to the inlet temperature sensor bridge. A connecting lead 43 connects one end of transformer secondary winding 42 to the junction point of resistors 30 and 33. A second connecting lead 44 connects the other end of transformer secondary winding 42 to the junction point of resistors 31 and 32. As a signal is generated at the bridge of inlet temperature sensor 11 it is sent to a rate insertion network 47 by a connecting lead 50 which is connected on one end at the junction point of resistors 30 and 31. Rate insertion network 47 comprises a capacitor 51 and a resistor 52 which are connected in parallel and the combination has one of its common ends connected to the remaining end of connecting lead 50. Rate insertion network 47 further comprises a resistor 53 which is connected to ground 34 on one end and connected to the remaining common ends of capacitor 51 and resistor 52. The rate insertion network 47 is connected to a phase sensitive amplifier 54 by a connecting lead 55 which is connected at the junction of resistors 52 and 53 on one end and amplifier 54 on the other. Phase sensitive amplifier 54 has its input connected to ground 34 by a connecting lead 56. Phase sensitive amplifier 54 receives excitation voltage 37 through a pair of connecting leads 57 and 58 which are connected to power leads 45 and 46. A two phase motor 60 is connected to phase sensitive amplifier 54 by a pair of connecting leads 61 and 62. Two phase motor 60 is also excited by alternating voltage source 37 through a pair of connecting leads 63 and 64 which are connected to power leads 45 and 46. Two phase motor 60 rotates a suitable gear train 65 through a connecting shaft 66 and gear train 65 drives a pair of shafts 67 and 68. Shaft 67 is connected to movable contact arm 35 to null out the bridge network in inlet-temperature sensor 11 and thus reduce the signal which is presented to phase sensitive amplifier 54 to null value. Phase sensitive amplifier 54 and two phase motor 60 may be of the type shown in the Robert R. Chapman Patent 2,547,621 issued on April 3, 1951. As shaft 68 is rotated it positions a movable contact arm 71 of a potentiometer 70. Potentiometer 70 also has a resistive element 72 which is connected in parallel with a voltage source 73. Resistive element 72 has one end connected to ground 34. A potentiometer 74 comprises a movable contact arm 75 and a resistive element 76. Resistive element 76 has one end connected to ground 34 and the other end connected to movable contact arm 71 through a connecting lead 77. The signal which appears on movable contact arm 71 as representative of compressor inlet total temperature $T_{t2}$ is impressed across resistive element 76 which may be a non-linear resistive element. Pressure ratio transducer 78 of computer 15 receives inputs of $P_{t7}$ and $P_{t2}$ which are the turbine outlet total pressure and compressor inlet total pressure respectively. Pressure ratio transducer 78 utilizes suitable apparatus to produce a signal of the form of $$\frac{P_{t7}}{P_{t2}} - 1$$

and this signal being representative of some engine pressure ratio is sent to a phase sensitive amplifier 80 through a connecting lead 81. Pressure ratio transducer 78 is connected to ground 34 through a connecting lead 82 and phase sensitive amplifier 80 has its input connected to ground 34 through a connecting lead 83. Phase sensitive amplifier 80 receives excitation voltage 37 through a pair of connecting leads 84 and 85 which are connected to power leads 45 and 46. A two phase motor 86 is energized by phase sensitive amplifier 80 through a pair of connecting leads 87 and 88. Two phase motor 86 is also energized by alternating voltage source 37 through a pair of connecting leads 90 and 91 which are connected to power leads 45 and 46. Phase sensitive amplifier 80 and two phase motor 86 may be identical to phase sensitive amplifier 54 and two phase motor 60. Gear train 92 is driven by a shaft 93 which is a part of two phase motor 86. Gear train 92 drives a pair of shafts 94 and 95 which are connected to movable contact arm 75 and to an operable device of pressure ratio transducer 78 respectively which will cause the output signal to equal the input. Thus the signal which appears on movable contact arm 75 will be the product of compressor inlet total temperature $T_{t2}$ and the quantity $$\frac{P_{t7}}{P_{t2}} - 1$$

Area transducer 21 in its simplest form comprises a potentiometer having a movable contact arm 96 and a resistive element 97. One end of resistive element 97 is connected to ground 34. The other end of resistive element 97 is connected to movable contact arm 75 by a connecting lead 98. Thus there exists a signal which is a function of $$T_{t2} \text{ and } \frac{P_{t7}}{P_{t2}} - 1$$

which is developed across resistive element 97. Exhaust nozzle doors 22 and 23 are actuated by a control function through a connecting link 100 and this movement is transferred to movable contact arm 96 through a suitable connecting means 101. Movable contact arm 96 is connected to a summing amplifier 102 by a connecting lead 103 and a resistor 104 of a summing network 105. Besides resistor 104, summing network 105 comprises resistors 106 and 107. For a given cross sectional area $A_8$ at station 8, a signal representative of the available thrust of jet engine 10 is presented to summing amplifier 102.

Summing amplifier 102 is connected to ground 34 through a connecting lead 110. Summing amplifier 102 is excited by a voltage source 137 through a pair of connecting leads 108 and 109. A motor generator combination 111 comprises a motor 112 and a rate generator 113. Rate generator 113 and motor 112 are energized from voltage source 137 through a pair of connecting leads 119 and 129.

Motor 112 is connected to summing amplifier 102 through a pair of connecting leads 114 and 115. Motor 112 and rate generator 113 are connected by a common shaft 116 which drives a gear train 117. Gear train 117 drives thrust indicator 26 through a connecting shaft 118. A potentiometer 120 comprises a movable contact arm 121 and a resistive element 122. Resistive element 122 is connected in parallel with a voltage source 123 and one end of resistive element 122 is connected to ground 34. Movable contact arm 121 is connected to gear train 117 by a shaft 124 and is electrically connected to summing amplifier 102 through a connecting lead 125 and summing resistor 106. The signal developed across resistive element 122 is of opposite sense and equal magnitude to the input signal from movable contact arm 96 when motor 112 is at rest or a null position. To provide damping if desired in this servo circuit, a negative feedback signal is developed at rate generator 113 and dropped across a resistive element 126 of a potentiometer 127. Potentiometer 127 has one end of resistive element 126 connected to ground 34 and has a movable contact arm 130 which is connected to summing amplifier 102 through a connecting lead 131 and resistor 107. Summing amplifier 102 and motor generator combination 111 may be any one of the many common types used to produce a shaft rotation which is representative of the sum of a magnitude and sense of a condition.

*Operation*

For a typical operation it will first be assumed that nozzle exit doors 22 and 23 remain in a fixed position and thereby provide a constant cross sectional area $A_8$ of the tailpipe nozzle at station 8. As temperature probe 30 picks up a change of compressor total temperature $T_{t2}$ the resistance change in resistor 30 unbalances the bridge network in temperature sensor 11 and an electrical signal is sent to rate insertion network 47 where a rate signal is combined with the steady state signal and presented to phase sensitive amplifier 54. The signal is amplified and sent to the control field of two phase motor 60 which causes motor shaft 66 to be rotated and thereby rotates gear train 65 causing shafts 67 and 68 to be rotated. Shaft 67 is connected to movable contact arm 35 of variable resistor 31 and as the resistance of resistor 31 is adjusted, it causes the inlet temperature sensor bridge to be balanced which reduces the $T_{t2}$ signal to phase sensitive amplifier 54 to a null value. This causes motor 60 to be driven to a stationary or fixed position which is representative of input signal $T_{t2}$. Potentiometer 70 has its resistive element 72 connected across a voltage source 73 in such a manner that movable contact arm 71 when positioned by shaft 68, causes a signal representative of $T_{t2}$ to be developed at movable contact arm 71 which is sent to resistive element 76 of potentiometer 74. Pressure ratio transducer 78 has inputs from the compressor input at station 2 and the turbine output at station 7 to provide a pressure ratio which exists across turbojet engine 10 and this ratio is subtracted from a value of unity by a suitable gearing and cam arrangement and this signal is used as an input signal to drive phase sensitive amplifier 80. After amplification, phase sensitive amplifier 80 energizes the control field of two phase motor 86 and causes motor 86 to be driven to a position representative of the quantity $$\frac{P_{t7}}{P_{t2}} - 1$$

Motor 86 then rotates shaft 93 and gear train 92. Gear train 92 causes shaft 95 to be rotated and by a suitable mechanism rebalances the signal existing in pressure ratio transducer 78 thereby causing the signal to phase sensitive amplifier 80 to be reduced to a null voltage. As gear train 92 is rotated, shaft 94 positions movable contact arm 75 and thus adjusts it to a position representative of the quantity $$\frac{P_{t7}}{P_{t2}} - 1$$

This operation produces a product signal which is a product of the signal representative of the engine pressure ratio and the compressor inlet total temperature. This signal is developed at movable contact arm 75 and is used to energize resistive element 97 of potentiometer 21. As this example was chosen where tailpipe cross sectional area $A_8$ remains fixed, a portion of the product signal is further multiplied by a signal representative of the cross sectional area of the tailpipe and this signal is present on movable contact arm 96. This signal is sent to summing amplifier 102 where it is amplified and sent to the control field of motor 112. Motor 112 and rate generator 113 are on a common shaft and as motor 112 is rotated it rotates gear train 117 through a shaft 116. As gear train 117 is rotated, it positions shaft 118 to drive a needle on thrust indicator 26 to the position representative of the available thrust from the jet engine. A balance signal is created by having gear train 117 position movable contact arm 121 of potentiometer 120 through a shaft 124 such that a voltage is developed across the resistive element 122 of potentiometer 120. The polarity of voltage source 123 is so chosen that when applied to the resistive element 122 there is a signal of equal magnitude and opposite sense which will be applied to the input of summing amplifier 102 and this signal then causes the net signal to summing amplifier 102 to be a zero value or null voltage. In order to prevent oscillations in the servo which drives the needle of thrust indicator 26, rate generator 113 supplies a negative feedback signal which is impressed across resistive element 126. A portion of the feedback signal is picked off by movable contact arm 130 and is introduced to summing amplifier 102, thereby preventing any oscillations.

Since the available thrust is directly proportional to the cross sectional area of the tail pipe at station 8, an additional signal is required when the engine is used in the after burning mode of operation and this is accomplished by a suitable link 100 connected to the actuating source which adjusts nozzle exit doors 22 and 23 during afterburning. As nozzle exit doors 22 and 23 are opened, movable contact arm 96 is repositioned to indicate that the doors are opening during the afterburning mode of operation and this signal then increases the signal available to summing amplifier 102 which will be indicated on thrust indicator 26. Assuming for a given constant tailpipe cross sectional area $A_8$ that thrust indicator 26 would be set to a maximum value of 100 percent, in the afterburning mode of operation this thrust would then be increased to some value over the normal operation and would be in a range above 100 percent.

While I have shown and described a specific embodiment of this invention, the invention should not be limited to the particular form shown, and I intend in the appended claims to cover all modifications which do not depart from the spirit and scope of the invention.

What I claim:

1. Apparatus for indicating percent of available thrust of a jet-engine having an inlet, a compressor, a turbine, and a variable area nozzle, said apparatus comprising: a pressure-ratio computer comprising means to sense a discharge pressure at said turbine and an inlet pressure at said compressor, said pressure-ratio computer including means for producing a pressure-ratio signal which is representative of a ratio of said discharge pressure to said inlet pressure; a temperature sensor adapted to sense an inlet temperature at said compressor including means for producing an inlet temperature signal; an area transducer adapted to be actuated by an area change of said variable area nozzle including means for producing a nozzle area signal; interconnecting means for operatively connecting said temperature sensor and said area transducer to said pressure-ratio computer, said interconnecting means including product means for producing a thrust signal as a product of said pressure-ratio signal, said inlet temperature signal, and said nozzle area signal; and a thrust indicator operatively connected to said pressure-ratio computer, said temperature sensor, and said area transducer, said thrust indicator being energized by said thrust signal causing said thrust indicator to indicate the percent of available thrust from said jet-engine.

2. Apparatus for indicating thrust of a jet-engine, having an inlet, a compressor, a turbine, and a variable area nozzle, said apparatus comprising: a first transducer adapted to sense a discharge pressure at said turbine and an inlet pressure at said compressor; a pressure ratio device including said first transducer for producing a first signal which is representative of a ratio of said discharge pressure to said inlet pressure; a second transducer adapted to sense an inlet temperature at said compressor including means for producing an inlet temperature signal; a third transducer adapted to be actuated by an area change of said variable area nozzle including means for producing a nozzle area signal; interconnecting means for operatively connecting said second transducer and said third transducer to said pressure ratio device, said interconnecting means including product means for producing a thrust signal as a product of said first signal, said inlet temperature signal, and said nozzle area signal; and a thrust indicator operatively connected to said second, and third transducer and said pressure ratio device, said thrust indicator being energized by said thrust signal causing said thrust indicator to indicate the available thrust from said jet-engine.

3. Apparatus for indicating thrust of a jet-engine having an inlet, a compressor, a turbine, and a variable area nozzle, said apparatus comprising: first means adapted to measure a discharge pressure at said turbine and an inlet pressure at said compressor, said first means including means for producing a first signal which is representative of a ratio of said discharge pressure to said inlet pressure; second means adapted to measure an inlet temperature at said compressor including means for producing a second signal; third means adapted to be actuated by an area change of said variable area nozzle including means for producing a third signal; interconnecting means for operatively connecting said second means and said third means to said first means, said interconnecting means including product means for producing a thrust signal as a product of said first signal, said second signal, and said third signal; and a thrust indicator operatively connected to said first, second, and said third means, said thrust indicator being energized by said thrust signal causing said thrust indicator to indicate the available thrust from said jet-engine.

4. Apparatus for indicating thrust of a jet-engine having an inlet, a compressor, and a turbine, said apparatus comprising: first means responsive to a discharge pressure at said turbine and an inlet pressure at said compressor, said first means including means for producing a signal which is representative of a ratio of said pressures at said turbine and said compressor; second means responsive to a temperature at said compressor including means for producing a temperature signal; third means for operatively connecting said second means to said first means, said third means including multiplying means for producing a thrust signal as a product of said signal which is representative of said ratio, and said temperature signal; and fourth means operatively connected to said first, and second means, said fourth means being energized by said thrust signal.

5. Thrust indicating apparatus for indicating the thrust of a jet-engine comprising: first means, including means responsive to turbine discharge pressure of said jet-engine and means responsive to compressor inlet pressure of said jet-engine, for providing a pressure ratio signal; second means responsive to an inlet temperature of said jet-engine for providing a temperature signal; multiplying means; interconnecting means interconnecting said first and second means to said multiplying means, said multiplying means providing a signal representative of thrust as a straight line function of said engine pressure ratio; and indicating means connected to said multiplying means to be energized by said signal representative of thrust so that said indicating means indicates the percentage of available net thrust being produced by said jet-engine.

6. Thrust indicating apparatus for indicating the thrust of a jet-engine having a nozzle of variable cross-sectional area, said apparatus comprising: first means, including means responsive to turbine discharge pressure of said jet-engine and means responsive to compressor inlet pressure of said jet-engine, for providing a pressure ratio signal; second means responsive to an inlet temperature of said jet engine for providing a temperature signal; third means responsive to an area change of said jet-engine nozzle to provide a nozzle cross sectional area signal; multiplying means; interconnecting means interconnecting said first, second, and third means to said multiplying means, said multiplying means providing a signal representative of thrust as a straight line function of said pressure ratio; and indicating means connected to said multiplying means to be energized by said signal representative of thrust so that said indicating means indicates the percentage of available net thrust being produced by said jet-engine.

7. Apparatus for indicating thrust of a jet-engine, said apparatus comprising: first means responsive to a pair of pressures, one of said pressures being a turbine discharge pressure of said jet-engine and the other being a compressor inlet pressure of said jet-engine, said first means including means for producing a signal which is representative of a pressure ratio of said turbine pressure to said compressor pressure; second means responsive to a temperature sensed in the inlet of said jet engine including means for producing a signal which is representative of said temperature, said temperature being a function of ambient static temperature and Mach number; interconnecting means operatively connecting said first and second means, said interconnecting means including computing means for computing a thrust signal by multiplying said signal which is representative of said temperature by said signal which is representative of said pressure ratio; and means including indicating means operatively connected to said first means, and said second means, said means being energized by said thrust signal.

References Cited in the file of this patent

UNITED STATES PATENTS

| | | |
|---|---|---|
| 2,524,749 | Baldridge | Oct. 10, 1950 |
| 2,579,617 | Schaevitz | Dec. 25, 1951 |
| 2,740,295 | Perchonok | Apr. 3, 1956 |
| 2,742,756 | DeBoisblanc | Apr. 24, 1956 |